Dec. 24, 1929.                R. E. SCHURTZ                1,740,715
       LIQUOR TRANSFER VALVE OPERATION FOR ABSORPTION REFRIGERATOR SYSTEMS
                           Filed Jan. 18, 1928
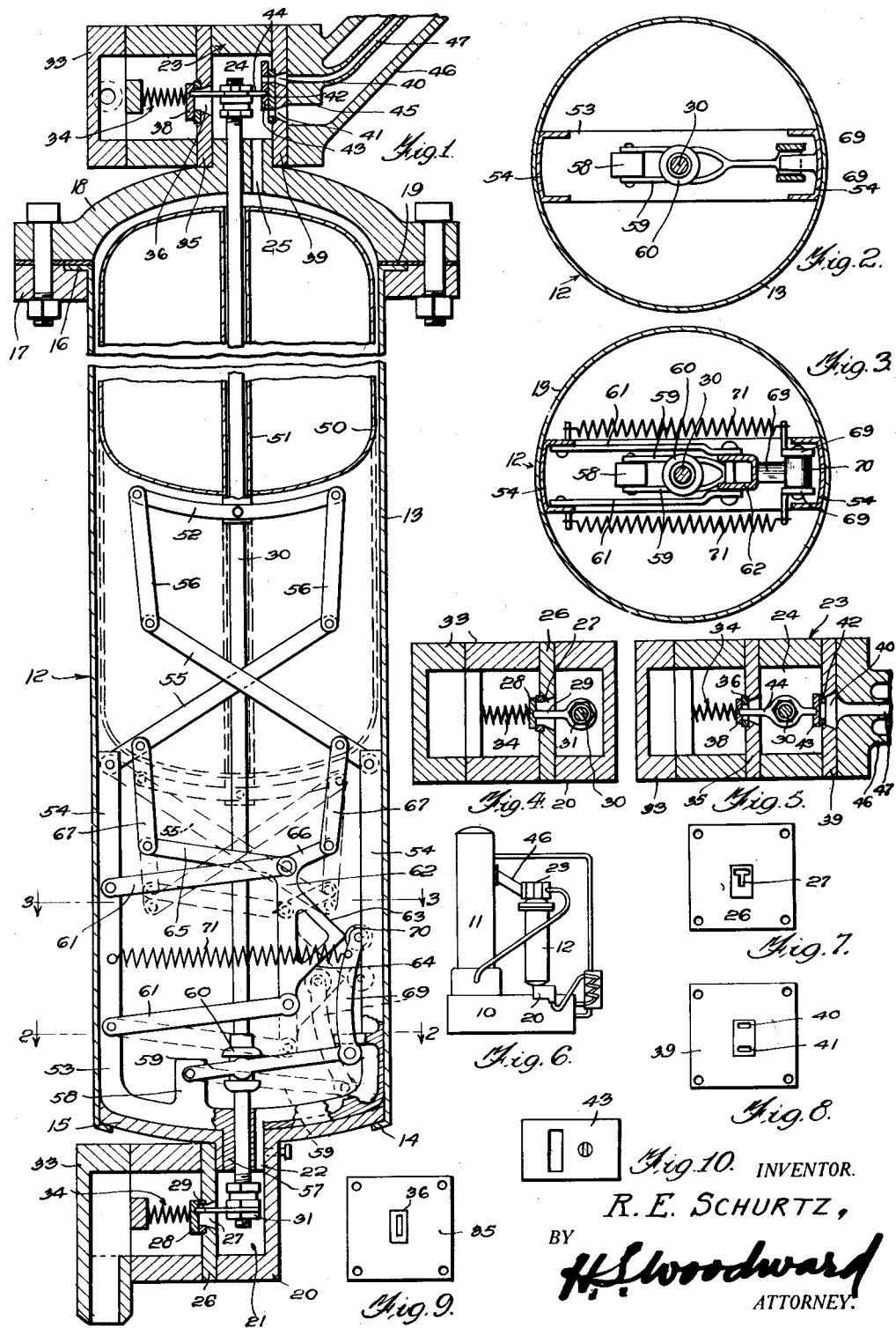
INVENTOR.
R. E. SCHURTZ,
BY
H. S. Woodward
ATTORNEY.

Patented Dec. 24, 1929

1,740,715

UNITED STATES PATENT OFFICE

RALPH E. SCHURTZ, OF KANSAS CITY, MISSOURI

LIQUOR-TRANSFER-VALVE OPERATION FOR ABSORPTION REFRIGERATOR SYSTEMS

Application filed January 18, 1928. Serial No. 247,656.

The invention has for an object to effect improvement in the operation of liquor transfer devices used in continuous still and absorption refrigeration systems, for the transfer of strong liquor from the absorber to the still. A particular aim is to present a dependable, durable and efficiently functioning means for causing action of the valves independently of a float or other primary operating member, and also to cause the same means to hold the valves securely in their several positions independently of such operating member. It is an advantage of my invention that the valves are held in each position without any variation of the holding force up to the instant when a shift of the valves to an opposite position is desired.

A further important object of the invention is to offer an improved mounting for such a device to the end that it may be readily assembled in a tank, and will be easily removable for inspection and repair. Another purpose is to so construct the mechanism that there will be a minimum of wear on the parts, and that they may be readily constructed and assembled in accordance with ordinary shop practices without involving great expense for production.

Additional objects, advantages and features of invention reside in the construction, arrangement and combination of parts involved in the embodiment of the invention, as may be understood from the following description and accompanying drawings, wherein Figure 1 is a vertical sectional view of a transfer device constructed in accordance with my invention, the alternate position of the cam and valve rod lever being indicated by dotted lines, while the position of the parts at the instant before shifting is indicated by solid lines.

Figure 2 is a horizontal section on the line 2—2 of Figure 1.

Figure 3 is a section on the line 3—3 of Figure 1.

Figure 4 is a cross section through the bottom valve, looking upward.

Figure 5 is a similar view through the top valves looking downward.

Figure 6 is an elevation showing tha transfer device in its relation to an absorber and still in a typical installation.

Figure 7 is a detail elevation of the discharge port plate.

Figure 8 is a similar view of the ports to the absorber.

Figure 9 is a similar view of the ports to the still-gas circuit.

Figure 10 is a similar view of the ports to the valve 43.

There is illustrated a generator or still 10, and an absorber 11 with an intermediate transfer receptacle or tank 12, forming a part of refrigeration systems which I have perfected, an example of which is shown in my application No. 639,860, filed May 18, 1923. As is well understood, the strong liquor from the absorber where a low pressure prevails, must be transferred to the still, where a high pressure prevails, and this is the function of the transfer device 11. Customarily I mount the absorber above the still in order to utilize gravity for the movement of the liquid.

The transfer receptacle as shown comprises ordinarily a seamless steel cylinder 13 having an inturned bottom flange 14 welded to a bottom head 15, although the latter may be formed as an integral part of the wall of the cylinder by well known methods. The cylinder has an outturned circumscribing flange 16 at the upper end clamped between a collar 17 and top head 18 with a suitable gasket 19 interposed adjacent the head. The bottom head is provided with an outlet neck or port block 20 having a planiform face at one side parallel to the axis of the cylinder, a recess 21 being formed in this face from which an opening 22 leads into the cylinder 13. The top head 18 is also provided with a port block 23 having a transverse circular passage or chamber 24 therethrough from which an axial bearing opening smaller than the one 22 leads into the cylinder, and in addition one or more passages 25 for the free interflow of liquid and gases to and from the cylinder. The port blocks may be formed integrally with the respective heads. The recess 21 is covered by a port plate 26 having a hard face piece around the liquor discharge port 27 therein. A valve 28 is provided slidable on the port facing to close the port 27 at times. The port is T-shaped, the stem slot at the lower part, and the valve is provided with a recess alined with the stem portion of the port, so as to receive removably the end of a valve stem 29 carried by the lower end of a valve-rod 30 to be described and projecting into the recess 21 from the cylinder. The stem 29 has an eye portion mounted revolubly on a nut 31 on the rod 30, the nut being held in adjusted position by a lock nut. The revoluble feature of this mounting may be omitted if desired.

The port plate 26 is covered by a cap construction 33 in one or more parts, bolted through the plate 26 to the port block 20 with suitable gaskets interposed. The cap is provided with an outlet tit adapted to be connected by usual piping to the still. A cross bar is also provided within the cap in line with and spaced from the port 27 to serve as a seat for a spring 34 bearing against and holding the valve 28 to its seat when open. The port block 23 at the upper end of the transfer is covered at one side with a port plate 35 ported and faced as at 36, the port being a still-gas port not requiring as great size as the one 27. It is a narrow vertical slot closed by a corresponding sliding valve 38 engaged and held to its seat when open by a spring 34 mounted in a cap 33 like that before described, (although the inlet tit may be of smaller interior dimension if desired). In the opposite side, the block 23 is closed by a double port plate 39 having an upper small absorber-gas port 40 and a lower larger or refill liquor port 41. The plate is faced on the inner side around these ports by a single facing or seat plate 42 in which the ports are accurately formed, both being in the form of horizontal slots. These ports are simultaneously closed or opened by a valve 43 in the form of a simple rectangular block having a slot adapted to aline with the port 40 when the lower edge of the valve clears the port 41. The material in the valve above the slot is also sufficient to close the port 40 when the valve is in lowered position closing the port 41.

The valve 43 and the valve 38 have respective alined recesses on their inner sides next the chamber 24 receiving respective ends of an operating stem 44 which is mounted on the upper end of the valve rod 30, and this mounting may be the same as the mounting of the valve stem 29 before described, or otherwise. Over the plate 39 there is a block 45 forming an integral terminal of an ajutage 46 leading into the absorber for the conduct of gas to, and liquor from, the absorber. Openings through the block 45 register with the ports 40—41, and if desired, an individual conduit 47 may be extended from the opening to port 40 upwardly within the ajutage 46 to conduct gas from the port with a minimum of impedance by liquor passing to the port 41, and also to prevent liquor from being blown out of the ajutage when still pressure is vented from the transfer device.

A float 50 is vertically movable in the tank 12 fitting as close to the sides of the cylinder 13 as possible while permitting its free movement and having a sealed tube 51 therethrough fitting loosely around the valve rod 30. The lower end of the tube projects downwardly from the float and has mounted thereon (pivotally if desired) a cross arm 52 by which connections are made with valve operating mechanism.

There is set in the tank 12 and fitted-slidably therein a frame 53, U-shaped in longitudinal section, the bight portion being at the bottom and resting upon the head 15. Two or more arms 54 extend upwardly close beside the interior face of the cylinder 13, at least two in the present instance being located opposite each other and having pivoted on their upper ends crossed levers 55 which are connected pivotally by links 56 to the respectively diametrically opposite ends of the cross arm 52. The levers 55 lie on opposite sides of the rod 30 with proper clearance and are of a length to swing downwardly below their fulcrums, permitting the float to reach a low position just above the ends of the arms 54.

The frame 53 is formed with a projection or projections 57 adapted to set in the opening through the head 15 to the block 20 and thereby center the frame in the tank. The valve rod is mounted slidably in the adjacent part of the frame 53. A set screw is engaged through the block 20 against the part 57. An upstanding lug or arm 58 is formed on the bottom member of the frame a distance from the rod 30 and in line with one arm 54, on which lug there are pivoted furcations of a lever 59 passing close to opposite sides of the rod. On the rod there is fixed a collar 60 flanged to project over and under both furcations of the lever which may be formed with circular bearing enlargements fitting closely between the flanges of the collar for good bearing engagement, as shown. The last-named lever is the direct operating means for the valve rod 30, by which it is reciprocated. On that arm 54 near the lug 58 there are pivoted a distance vertically apart links 61 extending toward the opposite side of the frame. These are pivotally connected to respective ends of a vertical part of a shifter cam 62 having the form of an equilateral triangle the base of which extends between the pivotal connections of the links last mentioned, the apex being projected outwardly from links and in a parallel plane. The cam is offset suitably from a diametrical plane. The outer inclined faces 63—64 of the cams are smoothly finished. From the upper end of the cam long and short arms 65—66 are projected horizontally inwardly and outwardly in the plane of the cam to points equally distant from the rod 30, and are there supported by pendant links 67 connected to respective levers 55 a short distance from the fulcrums of the latter. Movement of the lever 59 downwardly is limited by stops of any suitable character, on the frame 54.

To the end of the lever 59 there is attached a pair of links 69 between which there is mounted a wiper roller 70 and connected to the links there are springs 71 passing beside the cam to the opposite side of the frame 53 to which they are anchored so as to ever press the roller against the cam with goodly force for the action required. The inclination of the cam faces and the strength of the spring are such that whenever the apex of the cam moves beyond dead center under the roller, the roller will be caused by the spring to ride upon the newly engaged face of the cam by contraction of the spring, exerting through the links 69 a thrust on the lever 59, by which the valve rod is correspondingly shifted, with like effect upon the valves. A certain resistance to the movement of the float will have been developed by the bearing of the wiper on the cam, and the cam will tend to be shifted slightly by the action of the springs in a direction opposite that in which the roller moves, but inertia of the parts will be sufficient to insure prompt initiation of movement of the valve so that any backing up of the cam occurring will not prevent proper operation.

The cam is reciprocated in the necessary degree by the rise and fall of the float as will be appreciated, the lever and link connections between the float and cam serving as motion reducing means. The weight of the float is made sufficient to overcome the force of the springs 71 acting through the roller at the lower side of the cam tending to resist downward movement of the cam, while the buoyancy of the float is similarly sufficient to overcome the effect of the roller at the upper side of the cam. It is important to note that the movement of the valves and their retention in operated positions is actually accomplished independently of the float connections, because of the movement of the wiper on the cam. When in one extreme position the parts are held securely in such position by the constant action of the cam and spring-pressed roller until the instant when an opposite movement is required when the effect of the device is entirely reversed, the valves being oppositely moved and held at the opposite limit of movement constantly and securely until the instant of another reversal and movement toward the first position.

I claim:

1. A structure of the character described comprising a vertical cylindrical tank having ports at the top and bottom for admission and discharge of liquid, and for equilibrating pressures, a frame slidable in the tank longitudinally of the tank and adapted to seat on the bottom thereof removably an axial valve operating rod, valves operatively connected therewith and operatively associated with the ports, a float slidable around the rod and in the tank, a valve operating lever mounted on the frame, two links pivoted on the frame above the lever, a triangularly shaped member having one side connected to the swinging ends of the two said links, the two remaining sides being smoothly finished, a wiper movable thereon, a contractile spring anchored on the frame between the links and connected to the wiper, a link connection between the wiper and lever, and operative connections between the float and cam.

2. The structure of claim 1 in which the last named connections include motion reducing levers pivoted on the frame.

3. A transfer of the character described, comprising a tank, a float, two vertically spaced links having fixed pivots at one side and a cam connected to their swinging ends having external intersecting faces inclined to the path of the cam on the links, valve devices for the tank, a wiper movable on said faces of the cam, resilient means to bear the wiper toward the cam in a direction transverse to the movement of the cam, a valve operating member movable in the same general direction as the cam, and operative connection between the wiper and valve operating member.

4. A device of the character described comprising a vertically cylindrical tank having a slidable frame therein set upon the bottom of the tank, a valve device for the tank including a reciprocable member, a lever pivoted on the frame operatively connected with the reciprocable member, a cam reciprocable in the general direction of oscillation of said lever and having two external faces intersecting and inclined to the path of the cam, a wiper movable on said faces, resilient means to bear the wiper upon the cam transversely of the path of the cam, link connection between the wiper and lever, a float and operative connections between the float and cam, comprising main levers pivoted upon the frame at opposite sides, links connecting the extremities of the main levers to the float, and links connecting the cam intermediately to the main levers.

5. The structure of claim 4 in which the tank is formed with a neck at the bottom, an extension on said frame set in said neck, and a releasable fastening engaged through the neck and against the extension.

6. The structure of claim 4 in which the tank is formed with a neck at the bottom, an extension on said frame set in said neck, and a releasable fastening engaged through the neck and against the extension, said valve device being located in the neck beyond the frame extension, and said reciprocable member being journalled in the frame extension.

7. A device of the character described comprising a tank, a valve device for the tank including a reciprocable member, a lever operatively connected with the reciprocable member, a cam reciprocable in the general direction of oscillation of said lever and having two external faces intersecting and inclined to the path of the cam, a wiper movable on said faces, resilient means to bear the wiper upon the cam transversely of the path of the cam, link connection between the wiper and lever, a float and operative connections between the float and cam comprising main levers pivoted upon the frame at opposite sides, links connecting the extremities of the main levers to the float, and links connecting the cam intermediately to the main levers, the first named lever and cam being movable longitudinally of the tank.

In testimony whereof I affix my signature.

RALPH E. SCHURTZ.